United States Patent [19]

Zalewski et al.

[11] E Re. 29,213

[45] Reissued May 10, 1977

[54] WIRE ENAMEL BASED ON AMIDE-IMIDE HYDANTOIN POLYMERS

[75] Inventors: Edmund J. Zalewski, Schenectady, N.Y.; John L. Simonian, Bethune, France; John T. Keating, Schenectady, N.Y.

[73] Assignee: Schenectady Chemicals, Inc., Schenectady, N.Y.

[22] Filed: May 6, 1975

[21] Appl. No.: 565,696

Related U.S. Patent Documents

Reissue of:

[64] Patent No.: 3,838,088
Issued: Sept. 24, 1974
Appl. No.: 331,077
Filed: Feb. 9, 1973

U.S. Applications:

[63] Continuation of Ser. No. 166,594, July 27, 1971, abandoned.

[52] U.S. Cl. ..... 428/458; 260/30.2; 260/32.6 NT; 260/33.4 P; 260/33.6 R; 260/33.2 R; 260/78 A; 260/78 TF; 428/474

[51] Int. Cl.[2] ..... C08K 5/01; C08K 5/13; C08L 79/08; H01B 3/30

[58] Field of Search ..... 260/33.4 P, 32.6 NA, 260/32.6 NT, 78 T, 78 F, 77.5 AM, DIG. 34, 30.2, 78 A; 428/458, 474

[56] References Cited

UNITED STATES PATENTS

| | | | |
|---|---|---|---|
| 3,314,923 | 7/1967 | Muller | 260/78 |
| 3,345,334 | 10/1968 | Angelo | 260/47 |
| 3,489,696 | 1/1970 | Miller | 260/2.5 |
| 3,555,113 | 1/1971 | Sattler | 260/841 |
| 3,562,217 | 2/1971 | Zalewski | 260/63 |
| 3,578,639 | 5/1971 | Schaffer | 260/77.5 |
| 3,705,874 | 12/1972 | Merten | 260/47 CP |
| 3,843,587 | 10/1974 | Keating et al. | 260/33.4 P |

FOREIGN PATENTS OR APPLICATIONS

| | | |
|---|---|---|
| 872,315 | 6/1971 | Canada |
| 1,223,457 | 2/1971 | United Kingdom |

*Primary Examiner*—Allan Lieberman
*Attorney, Agent, or Firm*—Cushman, Darby & Cushman

[57] ABSTRACT

Amide-imide-hydantoin polymers are prepared from trimellitic anhydride, a diisocyanate and reacting the isocyanate terminated amide-imide with a glycine derivative of the formula

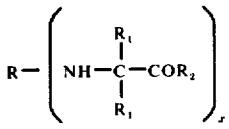

where R is aromatic, $R_1$ are the same or different and are hydrogen or alkyl, $R_2$ is dialkylamino, alkoxy or aroxy and x is an integer from 2 to 4. A portion of the trimellitic anhydride can be replaced by a dicarboxylic acid, a dianhydride or a tribasic acid. The products are soluble in cresol type solvent.

25 Claims, No Drawings

WIRE ENAMEL BASED ON AMIDE-IMIDE HYDANTOIN POLYMERS

Matter enclosed in heavy brackets [ ] appears in the original patent but forms no part of this reissue specification; matter printed in italics indicates the additions made by reissue.

This is a continuation of application Ser. No. 166,594 filed July 27, 1971, now abandoned.

The present invention relates to novel amide-imide-hydantoin polymers. The polymers are useful in making wire enamels to coat electrical conductors.

Due to the complex nature of the product, it is not possible to draw a complete structure of the product. A representative structure is $$-H-II-AI-AA-H-AI-H-AI-H-AI-AI-$$
$$-H-AI-AA-H-AI-II-H-$$

where AI stands for amide-imide, AA stands for amide-amido, H for hydantoin and II for imide-imide units. The two parts of the formula, (1) amide-imide and (2) hydantoin, culminate in a fairly uniform linkage distribution rather than in having extremely large blocks of amide-imide or hydantoin linkages. For simplicity, the polymer is shown as —AI—AA—H—II—.

The recurring hydantoin units have the formula

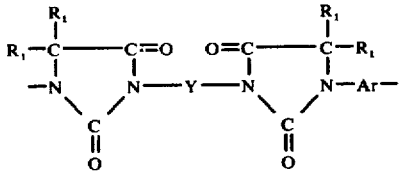

in which Ar represents an aromatic hydrocarbon or substituted aromatic hydrocarbon, e.g., substituted by halogen such as chloro or bromo, nitro, alkoxy, e.g. methoxy or ethoxy, alkyl, e.g., methyl, ethyl or butyl, dialkylamino, e.g., dimethyl amino acyl, e.g., acetyl or propionyl, carbalkoxy e.g., carbo-methoxy or carbo-ethoxy or cyano. The hydrocarbon ring can be derived from benzene, naphthalene, anthracene, diphenyl, or a substituted aromatic compound such as triphenylmethane, a diphenyl alkane, e.g., diphenylmethane, diphenylethane or diphenyl propane, a diphenyl alkene, e.g., stilbene, diphenyl ether, diphenyl thioether, diphenylsulfone, or a polyphenyl ether, $R_1$ is hydrogen or alkyl, usually hydrogen or alkyl of 1 to 6 carbon atoms, [ and Y ] *Y is the residue of the reaction product of trimellitic anhydride and a diisocyanate having the formula OCN-Z-NCO, where Z* is as defined for Ar or is alkylene of 4 to 10 carbon atoms, oxyalkylene of 4 to 10 atoms, or thioalkylene of 4 to 10 carbon atoms.

The polymers of the present invention having at least 5% of the linkages as recurring hydantoin units are soluble in cresylic type solvents, e.g., meta paracresol, cresylic acid, etc. In general 20 to 60% of the linkages preferably are present as recurring hydantoin units.

The wire enamels prepared from the polymers of the present invention have outstanding Freon blister resistance when used coated on wire, e.g., copper wire, for hermetic systems (Freon is a fluorinated hydrocarbon, e.g., monochlorodifluoromethane, Freon 22). Additionally, the wire enamels exhibit a general higher than average cut-through value, and higher G.E. abrasion scrape resistance than other cresylic acid soluble wire enamels.

The preferred procedure for forming the amide-imide-hydantoin polymers of the present invention is to react a diisocyanate with trimellitic anhydride, usually at 100% solids (i.e. in the absence of a solvent) (see also Sumitomo British Pat. 1,220,590). This permits the formation of an isocyanate terminated amide-imide prepolymer with no interference from the cresol type solvent. The amide-imide polymer has 20–80% amide groups and 80–20% imide groups, preferably 30–70% amide groups and 70–30% imide groups.

As the diisocyanate there can be used aromatic, aliphatic and cycloaliphatic diisocyanates such as 4,4'-methylene diphenyl diisocyanate, 2,4-toluene diisocyanate, isophorone diisocyanate, 2,6-toluene diisocyanate, ethyl benzene diisocyanate, tetramethylene diisocyanate, pentamethylene diisocyanate, hexamethylene diisocyanate, octamethylene diisocyanate, decamethylene diisocyanate, diisopropyl benzene diisocyanate, tri-isopropyl benzene diisocyanate, 2-chloro-p-phenylene diisocyanate, naphthalene diisocyanate, glycol-di-p-isocyanato phenyl ester, 4,4'-diisocyanato-diphenyl ether, 1,2-bis-p-isocyanato-phenylethane. 4,4'-diisocyanato-stilbene, 4,4'-diphenyl sulfone diisocyanate, 3,5,6-trichlorotolylene diisocyanate, xylylene diisocyanate, propyl benzene diisocyanate, m-phenylene diisocyanate, p-phenylene diisocyanate, dodecamethylene diisocyanate, tetrachloro-m-phenylene diisocyanate, 4,4'-bis-o-tolylene diisocyanate, 4,4'-methylene-di-o-tolylisocyanate, 4-methoxy-1,3-phenylene diisocyanate, 4-chloro-1,3-phenylene diisocyanate, 4-isopropyl-1,3-phenylene diisocyanate, 2,4'-diisocyanatodiphenyl ether, 3,3'-dimethyl-4,4'-diisocyanatodiphenyl methane, mesitylene diisocyanate, durylene diisocyanate.

After the isocyanate terminated amide-imide prepolymer is made, it is dissolved in a solvent, usually a cresylic solvent, e.g., p-cresol, o-cresol, m-cresol, cresylic acid or even in phenol with or without a hydrocarbon diluent, and is reacted with a glycine ester of the formula

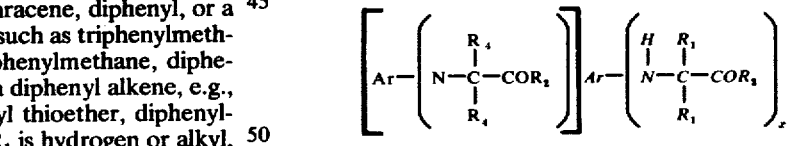

where Ar is as defined above, $R_1$ is as defined above (the $R_1$ groups can be the same or different), $R_2$ is dialkylamino, alkoxy or aryloxy, and x is an integer from 2 to 4. Thus, there can be used glycine derivatives disclosed in Merten, British Pat. 1,106,915, Mar. 20, 1968, e.g., methylene bis(N-phenyl glycine ethyl ester), methylene bis(N-phenyl glycine methyl ester), methylene bis(N-phenyl glycine propyl ester), methylene bis(N-phenyl glycine isopropyl ester), methylene bis (N-phenyl glycine butyl ester), methylene bis(N-phenyl glycine sec. butyl ester), methylene bis(N-phenyl glycine hexyl ester), methylene bis(N-phenyl glycine cyclohexyl ester), methylene bis(N-phenyl glycine isooctyl ester), methylene bis(N-phenyl glycine), methylene bis(N-phenyl N',N'-dimethyl glycinamide), methylene bis (N-phenyl-N',N'-dibutyl glycinamide), methylene bis(N-phenyl glycine phenyl ester), methylene bis (N-phenyl glycine p-tolyl ester), oxybis(N-phenyl glycine ethyl ester), oxybis(N-phenyl glycine methyl ester), thiobis (N-phenyl glycine ethyl ester), thiobis-(phenyl glycine butyl ester), sulfonec bis(N-phenyl glycine ethyl ester), oxybis(N-3-chlorophenyl glycine ethyl ester), oxybis(N-2-chlorophenyl glycine methyl ester), ethylene bis(N-phenyl glycine ethyl ester), tetramethylene bis(N-phenyl glycine amyl ester), hexamethylene bis(N-phenyl glycine methyl ester), decamethylene bis(N-phenyl glycine ethyl ester), diphenyl 4,4'-bis(glycine ethyl ester), stilbene-4,4'-bis(glycine ethyl ester), N,N'-bis carboxymethyl-2,2'-diaminobenzene, N,N'-bis(methoxycarbonyldimethylmethyl)-4,4'-diaminodiphenyl methane, ethylidene bis (N-phenyl glycine ethyl ester), isopropylidene bis(N-phenyl glycine ethyl ester), butylidene bis(N-phenyl glycine propyl ester), tridecane 6,6-bis(N-phenyl glycine ethyl ester), N,N'-bis(methoxycarbonyl-dimethylmethyl) m-phenylene diamine.

In the reaction of the trimellitic anhydride with the isocyanate, a portion of the trimellitic anhydride can be replaced by a dicarboxylic acid or a difunctional anhydride, i.e. a carboxylic dianhydride, in an amount of 0.1 to 50 mole percent based on the moles of trimellitic anhydride. Such dicarboxylic acids and dianhydrides include, for example, isophthalic acid (15 molar percent preferred), terephthalic acid (preferably not over 20 molar percent and most preferably 8 molar percent) phenylindane dicarboxylic acid, adipic acid, pimelic acid, 4,4'-dicarboxy diphenyl ether, 4,4'-dicarboxy diphenyl sulfone, benzophenone dianhydride, cyclopentane dianhydride and pyromellitic dianhydride. The only dicarboxylic acids which should be excluded are those which form imides by reaction with amines or isocyanates (e.g., ortho phthalic acid and glutaric acid).

A small portion of the trimellitic anhydride can be replaced by a trifunctional carboxylic acid to institute branching. Thus there can be used up to about 10 molar percent trimesic acid based on the trimellitic anhydride.

The molar ratio acid and anhydride reactants to methylene bis(N-phenyl glycine ethyl ester) or other hydantoin forming material can be from a high of 95:5 to a low of 5:95.

In general the range of reactants is as follows:

(1) diisocyanate 0.85 to 1.05 moles (1.00 preferred)

(2) glycine derivative 0.05 to 0.95 mole (0.40 preferred)

(3) trimellitic anhydride [ 0.05 or 0.5–0.6 ] *0.95* to 0.01 mole (0.4–0.5 preferred). *A more specific range is 0.5–0.6 mole.*

(4) dicarboxylic acid 0.0 to 0.3 mole (0.15 preferred)

(5) dianhydride 0.0 to 0.3 mole (0.2 preferred)

(6) tricarboxylic acid 0.0 to 0.05 mole (0.033 preferred)

(7) organometallic content, preferably organic titanates (0.0 to 1.0 mole (0.0–0.06 preferred).

The total of (2), (3), (4), (5) and (6) should range from 1.05 to 0.95 moles (preferably 1.00), i.e. the equivalents of diisocyanate or diisocyanate and organic titanate are about equal to the equivalents of the other reactants.

The organic titanate can be up to about 15 equivalent percent of the diisocyanate.

The reaction temperature is not critical but usually the hydantoins are formed by reacting at 80–500° C.

The solvents are preferably of the phenolic type as stated, e.g., cresylic acid, or individual cresols or mixtures thereof alone or with phenol, xylenol, chlorophenol, etc. When a hydrocarbon diluent is present, it can be present in an amount up to 46.5% or more of the solvent by volume, usually it is 10–25% of the solvent mixture by volume. Examples of such diluents are xylene, toluene, enamel wire naphtha, Solvesso 100 (aromatic naphtha boiling range 316–338° F.), Solvesso 150 (aromatic naphtha 366–399° F.), N-150 (aromatic naphthenes 372–500° F.).

Unless otherwise indicated, all parts and percentages are by weight.

The wire enamels prepared in the present invention can be applied to an electrical conductor, e.g. copper, silver, aluminum or stainless steel wire in conventional fashion, e.g., by the "free dip" method or the "die application" procedure, both of which procedures are described in Meyer Pat. 3,201,276. Wire speeds of 30 to 50 feet per minute or higher can be used with wire tower temperatures of 250–800° F., usually with a final temperature of above 500° F. The build-up of the polyamide-imide-hydantoin enamel on the wire can be 0.005 to 0.010 inch, preferably 0.002 to 0.004 inch using No. 18 wire. The wire is passed through the enamel one or more times until the desired build-up is obtained. (The build-up is the total increase in diameter over the bare wire diameter).

EXAMPLE 1

| | | G. |
|---|---|---|
| (1) | 4,4'-Methylene Diphenyl Diisocyanate (1.0 m.) | 250 |
| (2) | Trimellitic Anhydride (0.5 m.) | 96 |
| | Terephthalic Acid (0.1 m.) | 16 |
| (3) | Methylene bis(N-phenyl glycine ethyl ester) (0.4 m.) | 148 |
| (4) | N-methyl-2-pyrrolidone | 40 |
| (5) | M.P. Cresol | 246 |
| | C.P. Phenol | 494 |
| | Ortho Cresol | 146 |
| (6) | Cresylic Acid | 582 |
| | Xylene | 120 |
| | Phenol | 200 |

(1) was charged to a kettle equipped with an inert atmosphere inlet, agitator, reflux condenser and thermometer. (2) was added slowly while the temperature was increased to 330° F. The reaction temperature was held at 330–340° F. for 40 minutes. At the end of this period (4) was added. The batch began to liberate $CO_2$ rapidly. 200 g. of (5) was added. At 340° F. (3) was slowly added, until the batch temperature was 390° F. At this point the balance of (5) was added. The temperature dropped to 240° F. Heat was applied to a temperature of 380° F. It was held at this temperature. At this point (6) was added. The batch was cooled and filtered to provide wire enamel 1 having a final viscosity of X (Gardner-Holdt).

EXAMPLE 2

| | | G. |
|---|---|---|
| (1) | 4,4' Methylene Diphenyl Diisocyanate (1.0 m.) | 250 |
| | N-Methyl-2-pyrrolidone | 20 |
| (2) | Trimellitic Anhydride (0.5 m.) | 96 |
| (3) | Methylene bis (N-phenyl glycine ethyl ester (0.5 m.) | 185 |
| (4) | M.P. Cresol | 246 |
| | C.P. Phenol | 494 |
| | Ortho Cresol | 146 |
| (5) | Cresylic Acid | 582 |
| | Xylene | 420 |

(1) was added to the same type apparatus described in Example 1. (2) was added in the same manner. At 340° F. the batch began to eliminate $CO_2$ at a rapid rate. It was allowed to increase in temperature to 390° F. where it was thinned with (4). It was heated back up to 280° F. whereupon (3) was added rapidly. The batch was then heated to 380° F. until 27 gms. of ethanol had been removed. Then (5) was added. The batch was cooled and filtered to provide wire enamel 2 having a final viscosity at 17.5% solids of $Z1^+$ (Gardner-Holdt).

EXAMPLE 3

| | | G. |
|---|---|---|
| (1) | 4,4' Methylene Diphenyl Diisocyanate (1.0 m.) | 250 |
| (2) | Trimellitic Anhydride (0.5 m.) | 96 |
| (3) | Methylene bis (N-phenyl glycine ethyl ester) (0.5 m.) | 185 |
| (4) | M.P. Cresol | 246 |
| | C.P. Phenol | 494 |
| | Ortho Cresol | 146 |
| (5) | 4,4' Methylene Diphenyl Diisocyanate | 20 |
| (6) | Cresylic Acid | 382 |
| | Xylene | 120 |
| | C.P. Phenol | 200 |

(2) was added slowly to (1). The maximum temperature obtained was 340° F. The batch was held at 340° F. for one hour and 15 minutes whereupon half of (3) was added, then (4) was added, and the balance of (3) added after the temperature was raised from 180° F. to 240° F. The temperature was further increased to 380° F. and held. Only 16 ml. of ethanol were removed after 2 hours. At 380° F. (5) was added and held at 380° F. for an additional 1 to 2 hours. No additional ethanol was removed. The batch was filtered and cooled after the addition of (6) to give wire enamel 3 having a final viscosity of 20% solids of R (Gardner-Holdt).

EXAMPLE 4

| | | G. |
|---|---|---|
| (1) | 4,4' Methylene Diphenyl Diisocyanate (1.0 m.) | 250 |
| | N-Methyl-2-pyrrolidone | 20 |
| (2) | Trimellitic Anhydride | 96 |
| (3) | Methylene bis (N-phenyl glycine ethyl ester) (0.4 m.) | 148 |
| (4) | Cresylic Acid ADF-14 | 1000 |
| (5) | Solvesso 100 | 400 |
| (6) | Cresylic Acid | 182 |
| | Solvesso 100 | 64 |

(2) was added to (1) over a half-hour period, the temperature being around 250° F. The temperature was raised to 340° F. at which point an exotherm was observed up to 362° F. At 362° F. 200 gms. of (4) was added. The temperature was raised to 350° F. and (3) was added slowly. The temperature was raised to 380° F. and after 14 gms. of ethanol had been collected the balance of (4) was added. The temperature was raised to 390° F. At this point (5) and (6) were added. The batch was cooled, and filtered to give wire enamel 4 having a final viscosity of $X^+$ (Gardner-Holdt) at 20% solids.

EXAMPLE 5

| | | G. |
|---|---|---|
| (1) | 4,4' Methylene Diphenyl Diisocyanate (1.0 m.) | 250 |

EXAMPLE 5-continued

| | | |
|---|---|---|
| | Trimellitic Anhydride (0.6 m.) | 116 |
| | N-methyl-2-pyrrolidone | 30 |
| (2) | M.P. Cresol | 200 |
| (3) | Methylene bis (N-phenyl glycine ethyl ester) (0.4 m.–2 g.) | 146 |
| (4) | Cresylic Acid ADF-14 | 848 |
| (5) | Solvesso 100 | 424 |
| (6) | M.P. Cresol | 224 |

(1) was heated slowly to 340° F., at which point an exotherm occurred to 388° F. At this point (2) was added, the temperature fell to 322° F. and (3) was added all at once. While the temperature was being raised (4) was added slowly. At the end of the addition the reaction temperature was raised to 380° F. At this point (5) and (6) were added. The batch was cooled and filtered to give wire enamel 5 having a final viscosity of X-Y (Gardner-Holdt) at 20% solids.

EXAMPLE 6

| | | G. |
|---|---|---|
| (1) | 4,4' Methylene diphenyl diisocyanate (1 m.) | 250 |
| | Trimellitic anhydride (0.6 m.) | 115 |
| (2) | N-methyl-2-pyrrolidone | 40 |
| (3) | C.P. Phenol | 200 |
| (4) | Methylene bis (N-phenyl glycine ethyl ester) (0.4 m.) | 148 |
| (5) | C.P. Phenol | 654 |
| | Ortho Cresol | 256 |
| | M.P. Cresol (meta-para cresol) | 598 |
| (6) | 4,4' Methylene diphenyl diisocyanate | 15 |
| (7) | Xylene | 256 |

(1) was heated to 410° F. Then the temperature was lowered to 340° F. whereupon (2) was added. The temperature was raised to 360° F. and (3) was added. Immediately after the addition of (3), (4) was added along with 250 g. of (5). The temperature was raised to 390° F. whereupon (6) was added and held for one more hour. At the end of this period, the batch was thinned with the balance of (5) and (7). The wire enamel thus produced has a final viscosity of $X^-$ (Gardner-Holdt) at 17.5% solids.

EXAMPLE 7

| | | G. |
|---|---|---|
| (1) | 4,4' Methylene Diphenyl Diisocyanate (1 m.+5 g.) | 255 |
| | Trimellitic Anhydride (0.6 m.) | 109 |
| | Trimesic Acid (0.033 m.) | 7 |
| (2) | N-methyl-2-pyrrolidone | 40 |
| (3) | Cresylic Acid | 200 |
| (4) | Methylene bis (N-phenyl glycine ethyl ester) (0.4 m.) | 148 |
| (5) | Cresylic Acid | 1173 |
| (6) | Solvesso 100 | 343 |

(1) was heated slowly to 380° F. The batch was cooled to 350° F. and (2) was added. The temperature was raised to 380° F. and (3) was added. At 350° F. (4) was added along with 500 gms. of (5). The batch was heated to 380° F. At this point an additional 250 gms. of (5) were added. The temperature was now raised to 400° F. At this point the balance of (5) was added along with (6). The batch was cooled and filtered to produce wire enamel 7 having a final viscosity of Z2 (Gardner-Holdt) at 20% solids.

The resulting wire enamels were applied to No. 18 copper wire and the results recorded in Table 1.

TABLE 1

| Example | Speed | Build (mils) | Appearance | Mandrel after snap | Cut thru °C. | (200° C.) Heat shock | (600 p.s.i.) Freon | GE repeated scrape |
|---|---|---|---|---|---|---|---|---|
| 1 | 40 | 2,9–3.0 | Good | 2× | 421–400 | 50–90–100–100 | OK | 69 |
| 2 | 40 | 2.8 | Very slightly wavy plus med. gr. | 2× | 300–400 | 0–90–100–100 | | 52 |
| 3 | 35 | 3.0 | Good, sl. gr. | 3× | 420–410 | 0–50–90–100 | | 30 |
| 4 | 35 | 2.8 | Very slightly wavy plus med. gr. | 3× | 380–450+ | 0–50–70–70 | OK | 312 |
| 5 | 35 | 2.8 | Very slight wave, med. gr. | 3× | 415–405 | 0–50–60–80 | | 70 |
| 6 | 30 | 2.7 | Very slightly wavy plus med. gr. | 2× | 399–388 | 0–60–80–90 | | 147 |
| 7 | 40 | 2.6 | " | 2× | 370–382 | 20–70–90–90 | | 43 |

EXAMPLE 8

| | | G. |
|---|---|---|
| (1) | 4,4' methylene diphenyl diisocyanate (1.0 m.) | 250 |
| | Trimellitic anhydride (0.5 m.) | 96 |
| | Benzophenone dianhydride (0.05 m.) | 16 |
| | Isophthalic acid (0.05 m.) | 8 |
| (2) | Tributyl amine | 5 |
| (3) | Cresylic acid | 700 |
| (4) | Methylene bis (N-phenylglycine ethyl ester) (0.4 m.) | 148 |
| (5) | Cresylic acid | 1079 |
| | Solvesso 100 (15% of solvent) | 319 |

(1) was charged into a 3-liter kettle and the temperature was increased to 370° F. over a period of 70 minutes. At 370° F. (2) was added dropwise while the batch was held at a minimum temperature of 360° F. for 50 minutes. At the end of this period (3) was added to dissolve the polymer formed. When all was dissolved (4) was added at 300° F. The temperature was raised to 400° F. over a period of 5 hours, then the batch was thinned with (5). The final viscosity and solids were X ¾ (Gardner-Holdt) at 17% solids.

WIRE RESULTS

| | | |
|---|---|---|
| Speed | 35'/min | 40'/min. |
| Appearance | Good, med. gr. | Good, med. gr. |
| Mandrel after snap | 3× | 2× |
| Cut through | 420–21° C. | 319–360° C. |
| Heat shock (260° C.) | 20–70–90–100 | 40–80–100–100. |

EXAMPLE 10

| | | G. |
|---|---|---|
| (1) | 4,4'-Methylene diphenyl diisocyanate (1.0 m.) | 250 |
| | Trimellitic anhydride (0.4 m.) | 77 |
| | Benzophenone dianhydride (0.2 m.) | 64 |
| (2) | Tributyl amine | 5 |
| (3) | Cresylic acid | 700 |
| (4) | Methylene bis(N-phenyl glycine ethyl ester) (0.4 m.) | 148 |
| (5) | Cresylic acid | 646 |
| (6) | C.P. Phenol | 431 |
| (7) | Solvesso 100 | 323 |

(1) was charged into a 3 liter kettle and heated with agitation over a period of 2 hours to a maximum temperature of 417° F. at which point (2) was slowly added followed by (3). After the polymer was dissolved in (3) and the temperature adjusted to 310° F., (4) was added and heated to 408° F. over a period of 10 hours, then it was thinned with (5), (6) and (7).

WIRE RESULTS

| | | | |
|---|---|---|---|
| | Speed | 35''/min | 40'/min. |
| | Appearance | Good | Good |
| | Mandrel after snap | 4× | 2× |
| *Cut* | [Gut] through | 39–410° C | 302–378° C. |
| | Heat shock (200° C.) | 20–60–90–100 | 50–90–100–100. |
| | Freon resistance (600 p.s.i.) | OK | OK. |
| *GE* | [OE] repeated scrape | 184 | 126 |

EXAMPLE 9

| | | G. |
|---|---|---|
| (1) | 4,4' methylene diphenyl diisocyanate | 8000 |
| | Trimellitic anhydride | 3072 |
| | Benzophenone dianhydride | 1024 |
| (2) | Tributyl amine | 160 |
| (3) | Cresylic acid | 30,400 |
| (4) | Methylene bis (N-phenyl glycine ethyl ester) | 4736 |
| (5) | C.P. Phenol | 13,623 |
| (6) | Solvesso 100 | 10,240 |
| (7) | Cresylic acid | 21,888 |

(1) was charged into a 15-gallon kettle and heated to 382° F. over a period of about 3 hours. At 382° F. (2) was added slowly over a period of 15 minutes then the batch was held for an additional 15 minutes. At the end of this period (3) was added to dissolve the polymer. When completely dissolved the temperature was adjusted to 300° F. and (4) was added. The heat was increased to a maximum of 402° F. over a period of 7 hours until a 25% check cut in cresylic acid was at $N^+$ viscosity with at least 1000 ml. of ethanol removed. The batch was then thinned with (5), (6) and (7).

WIRE RESULTS

| | |
|---|---|
| Speed | 40'/min. |
| Build | 2.7 mils. |
| Mandrel after snap | 2× |
| Appearance | Good. |
| Cut through | 385–388° C. |
| Heat shock (260° C.) | 50–90–90–100. |
| GE Repeated Scrape | 49. |

EXAMPLE 11

| | | G. |
|---|---|---|
| (1) | 4,4'-Methylene diphenyl Diisocyanate | |

EXAMPLE 11-continued

| | | |
|---|---|---|
| | (0.9 m.) | 225 |
| | Trimellitic anhydride (0.4 m.) | 77 |
| | Benzophenone dianhydride (0.2 m.) | 64 |
| (2) | Tributyl amine | 5 |
| (3) | Cresylic acid | 1000 |
| (4) | Methylene bis(N-phenylglycine ethyl ester) (0.4 m.) | 148 |
| (5) | Cresylic acid | 475 |
| (6) | Ethyl Cellosolve (5% of solvent) | 87 |
| (7) | Solvesso 100 (10% of solvent) | 174 |
| (8) | Tetraisopropyl titanate | 18 |

The procedure employed was similar to that in Example 8. The mixture of (5), (6) and (7) was used for thinning. After thinning, (8) was added. The solids were reduced to 17.5% calculated by the addition of 269 gms. of cresylic acid, 39 gms. of Solvesso 100 and 12 gms. of ethyl Cellosolve. The final viscosity was Z (Gardner-Holdt).

| WIRE RESULTS | | |
|---|---|---|
| Speed | 40'/min | 45'/min. |
| Build | 2.9-3.0 mils | 2.9-3.0 mils. |
| Mandrel after snap | 2× | 2× |
| Burnout (4 min. at 33 amps) | 10.1 kv | 9.3 kv. |
| Reliance burnout (40 amps vs. time). | 15+min. | 15+min. |
| Cut through | 450+-450+° C. | 450+-450° C. |
| Heat shock (260° C.) | 40-90-100-100 | 70-100-100-100. |
| Freon blister (600 p.s.i. for 72 hours). | Pass | Pass. |
| GE repeated scrape | 33 strokes | 24 strokes. |
| Emerson scrape | | 26. |

EXAMPLE 12

| | | G. |
|---|---|---|
| (1) | 4,4'-Methylene diphenyl Diisocyanate (0.9 m.) | 225 |
| | Trimellitic anhydride (0.4 m.) | 77 |
| | Benzophenone dianhydride (0.2 m.) | 64 |
| (2) | Tributyl amine | 5 |
| (3) | Cresylic acid | 1000 |
| (4) | Methylene bis(N-phenylglycine ethyl ester) (0.4 m.) | 148 |
| (5) | Cresylic acid | 134 |
| (6) | C.P. Phenol (20% of solvent) | 350 |
| (7) | Solvesso 100 (15% of solvent) | 264 |
| (8) | Tetraisopropyl titanate | 18 |

The procedure employed was identical with that in Example 11. The solids were 20%. The final viscosity was Y-½ (Gardner-Holdt).

| WIRE RESULTS | | |
|---|---|---|
| Speed | 40'/min | 45'/min. |
| Build | 2.8 mils | 2.7 mils. |
| Mandrel after snap | 3× | 3× |
| Cut through | 450+-450+° C | 450+-50+° C. |
| Heat shock (260° C.) | 30-80-100-100 | 20-80-100-100. |
| Freon blister (600 p.s.i. for 72 hours) | Pass | Pass. |
| GE repeated scrape | 51 strokes | 19 strokes. |
| Emerson scrape | | 21. |
| Burnout (4 min. at 33 amps) | 10.0 kv. | 7.8 kv. |

The major modification of Examples 11 and 12 is that only 0.9 mole of 4,4'-methylene diphenyl diisocyanate was employed. The 0.1 equivalent that was lacking for equivalency was made up with tetraisopropyl titanate. In place of the tetraisopropyl titanate, there can be employed other titanates, e.g. alkyl and aryl titanates such as tetramethyl titanate, tetrabutyl titanate, tetrapropyl titanate, tetrahexyl titanate, tetraphenyl titanate and tetracresyl titanate, as well as other titanates such as titanium glycolate and titanium tetratriethanolamine.

The major improvements in Examples 11 and 12 over the other examples are:

(1) they permit faster running speeds on the wire tower, (2) there is much higher cut through, (3) there is more consistent mandrel after snap results, (4) there is more consistent burnout (4 min. at 33 amps), (5) there is a higher Reliance burnout, and (6) there is a better Emerson scrape.

It should be noted that one mole of titanate is considered to contain 3 equivalents since one of the organic groups is not readily removable.

A number of comparative experiments were run following the teachings of Merten British Pat. 1,106,915. An attempt to perform Example 37 resulted in the production of a polymer which was insoluble in the recommended solvent, dimethyl sulfoxide and diethyl acetamide (weight ratio 1:1). Examples 33 and 34 of Merten were repeated and the products run on the wire with the following results.

| WIRE RESULTS-MERTEN EXAMPLE 33 | | |
|---|---|---|
| Speed | 35'/min | 40'/min. |
| Appearance | Very slightly wavy plus. | Very slightly wavy plus occasional specks. |
| Mandrel after snap | 3× | 2× |
| Cut through | 320-315° C. | 282-200° C. |
| Heat shock (at 260° C.) | 50-80-100-100 | 60-80-100-100. |

-continued

| | | |
|---|---|---|
| Burnout (4 min. at 33 amps). | 5.3 kv. | 2.0 kv. |
| Freon blister (600 p.s.i. for 72 hours). | Pass | Pass. |
| GE scrape | 90 strokes | 102 strokes. |

WIRE RESULTS-MERTEN EXAMPLE 34

| | | |
|---|---|---|
| Speed | 35'/min | 40'/min. |
| Appearance | Very slightly wavy, occ. specks. | Very slightly wavy plus. |
| Mandrel after snap | 2× | 2× |
| Cut through | | 282–290° C. |
| Heat shock (260° C.) | | 70–90–100–100. |
| Burnout (4 min. at 33 amps). | | 1.9 kv. |
| GE scrape | | 73 strokes. |

The Gel Permeation Chromatography of Merten's hydantoin and the amide-imide-hydantoin of the present invention were compared. The amide-imide-hydantoin appears to have a slightly larger molecular size.

What is claimed is:

1. An amide-imide-hydantoin polymer wherein the recurring hydantoin units are 5 to 95% of the total linkages and the amide groups are 20 to 80% of the total number of the amide and imide groups, the recurring hydantoin units having the formula:

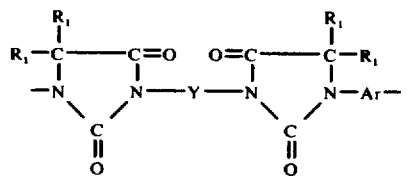

wherein the symbol Ar represents an aromatic hydrocarbon radical or an aromatic hydrocarbon radical carrying a substituent group selected from the class consisting of halo, nitro, alkyl, alkoxy, dialkylamino, acyl, carbalkoxy or cyano; the symbol Y represents *the residue of the reaction product of trimellitic anhydride and a diisocyanate having the formula OCN-Z-NCO where Z represents* a radical as defined for Ar or is an alkylene radical of 4 to 10 carbon atoms, an oxyalkylene radical of 4 to 10 carbon atoms or a thioalkylene radical of 4 to 10 carbon atoms; the symbol $R_1$ represents hydrogen or an alkyl radical, and wherein the said hydantoin units are formed by reacting (A) a glycine derivative of the formula

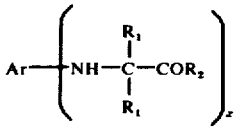

wherein $R_2$ is a dialkylamino, alkoxy or aryloxy radical and x is an integer from 2 to 4, with (B) a preformed amide-imide prepolymer having terminal isocyanate groups, said prepolymer having been prepared by reacting (1) trimellitic anhydride or (2) a mixture of trimellitic anhydride with a dicarboxylic acid or carboxylic acid dianhydride or tricarboxylic acid with (a) a diisocyanate, or (b) a diisocyanate and up to about 15 equivalent percent of an organic titanate.

2. A polymer according to claim 1 wherein 20 to 60% of the total linkages are recurring hydantoin units.

3. A polymer according to claim 1 wherein 30 to 95% of the total linkages are recurring hydantoin units.

4. A polymer according to claim 1 wherein 30 to 70% of the total number of amide and imide groups are amide groups.

5. A polymer according to claim 1 wherein the reaction between the trimellitic anhydride and the diisocyanate is carried out in the absence of solvent and a cresylic solvent of phenol is added as a solvent to the prepolymer thus formed and the glycine derivative is converted to hydantoin units in the presence of said added solvent and prepolymer.

6. A polymer according to claim 1 wherein Ar and Y are both hydrocarbon and the diisocyanate is an aromatic diisocyanate.

7. A polymer according to claim 6 prepared from reactants comprising (1) [0.95] *0.85* to 1.05 moles of diisocyanate, (2) 0.05 to 0.95 mole of glycine derivative, (3) 0.95 to 0.01 mole of trimellitic anhydride, (4) 0.0 to 0.3 mole of dicarboxylic acid, (5) 0.0 to 0.3 mole of carboxylic dianhydride and (6) 0.0 to 0.05 mole of tricarboxylic acid, (7) 0.0 to 0.06 mole of organic titanate, the total of (2), (3), (4), (5) and (6) being from 1.05 to 0.95 moles.

8. A polymer according to claim 7 wherein the trimellitic anhydride is 100% of the total of (3), (4), (5) and (6).

9. A polymer according to claim 7 wherein the trimellitic anhydride is 99.9–[9.60] *60%* of the total moles of (3), (4), (5) and (6).

10. A polymer according to claim 7 wherein the trimellitic anhydride is 60–100% of the total of (3), (4), (5) and (6).

11. A polymer according to claim 10 wherein the trimellitic anhydride is present in an amount of 0.05–0.6 mole.

12. A polymer according to claim 10 in which the amount of (6) is 0.

13. A polymer according to claim 10 wherein all $R_1$ groups are hydrogen.

14. A polymer according to claim 13 wherein the starting glycine derivative is methylene bis (N-phenylglycine lower alkyl ester).

15. A polymer according to claim 13 wherein Y and Ar are both methylene bis (phenyl).

16. A wire enamel composition containing the product of claim 2 in a solvent.

17. A product according to claim 16 wherein the solvent is a cresol solvent.

18. A product according to claim 17 wherein the solvent also includes an aromatic hydrocarbon.

19. A wire enamel composition containing the product of claim 1 in a solvent.

20. An electrical conductor coated with the product of claim 1.

21. The process of preparing the product of claim 1 comprising heating a glycine derivative of the formula

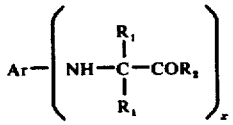

with a preformed amide-imide prepolymer having terminal isocyanate groups.

22. A process according to claim 21 wherein there is included a small amount of an organic titanate as a reactant.

23. A product according to claim 1 wherein the polymer contains at least 30% of the total linkages as recurring hydantoin units and the polymer is modified by containing titanate linkages.

24. A process according to claim 21, including the steps of forming said preformed amide-imide prepolymer by (a) reacting the trimellitic anhydride and diisocyanate in the absence of a solvent, (b) adding a cresylic solvent or phenol as a solvent to the prepolymer thus formed and converting the glycine derivative to hydantoin in the presence of said added solvent and prepolymer.

25. A polymer according to claim 10 wherein the trimellitic anhydride is present in an amount of 0.4–0.5 mole.

* * * * *